ABSTRACT OF THE DISCLOSURE

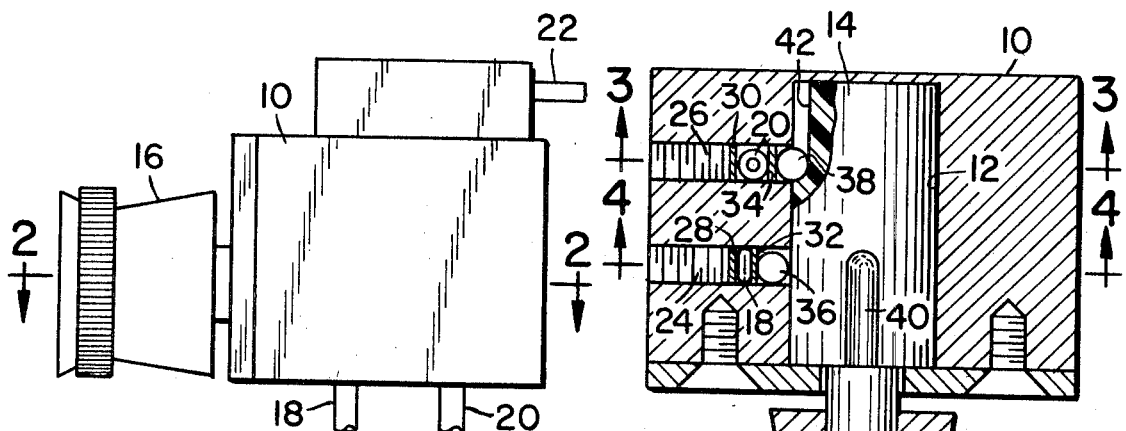
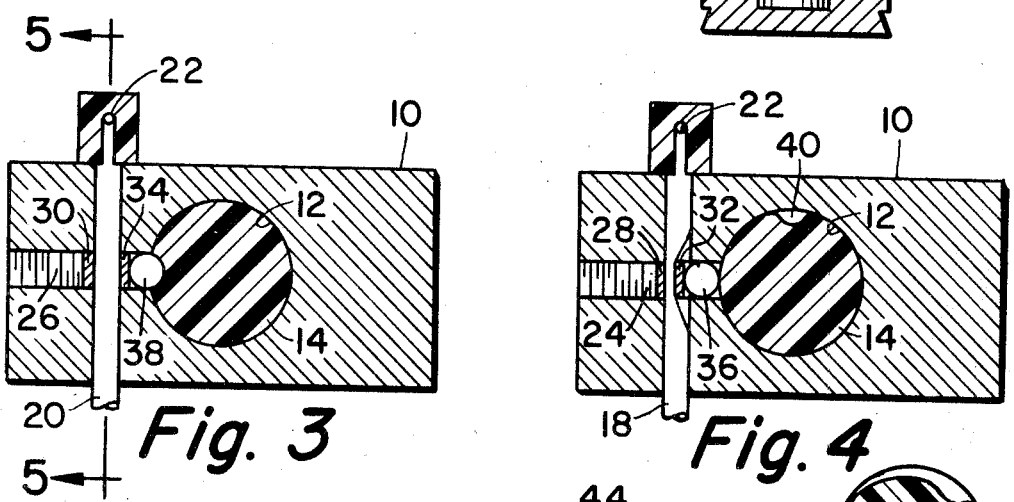
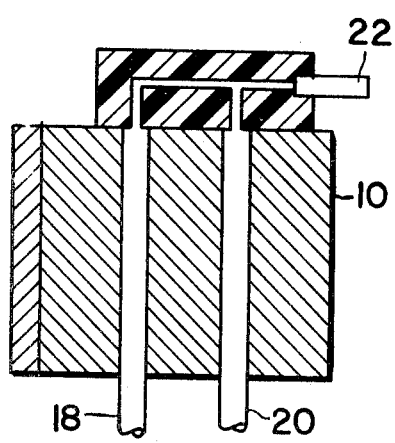
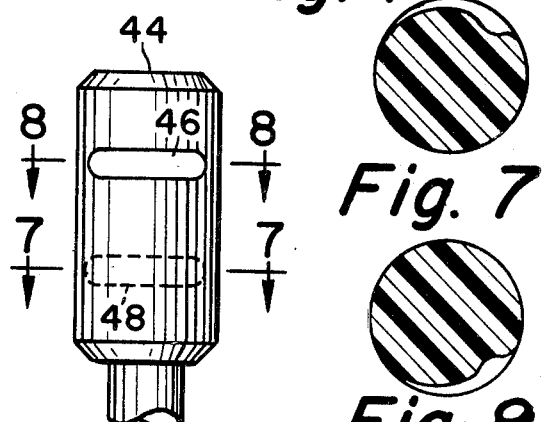
INVENTOR.
Robert B. Mullaly
BY William D. Fosdick
AGENT / 3,515,170
CONSTRICTION VALVE FOR FLEXIBLE TUBES
Robert B. Mullaly, West Roxbury, Mass., assignor to
Corning Glass Works, Corning, N.Y., a corporation
of New York
Filed Dec. 4, 1967, Ser. No. 687,603
Int. Cl. F16k 7/04
U.S. Cl. 137—636.1                              3 Claims

A valve having multiple inlets in the form of flexible tubes communicating with a single outlet. The inlet tubes are pinched closed by the action of beads which bear against a cylindrical plug in the housing which supports the tubes. At selected positions of rotation of the plug the beads fall partially into indentations in the plugs, thereby selectively opening the inlet tubes and permitting fluid flow therethrough.

BACKGROUND OF THE INVENTION

This invention relates to the field of fluid control valves, particularly those which permit flow selection among a plurality of source fluids. The invention further particularly relates to the field of valves for use in laboratory apparatus.

Valves for use in laboratory apparatus generally are of the conventional stopcock variety, wherein a seal is effected between the surface of a plug which is rotatable in a housing and the bore of the housing itself. An example of such a stopcock, having utility for the selection of input fluids is described in U.S. Pat. 1,973,754, to W. O. Geyer. A disadvantage generally associated with such stopcocks is that both the outer surface of the plug and the inner surface of the housing must be formed with great precision in order to prevent leakage. It is an object of the present invention to provide a valve in which the need for precise construction in order to prevent leakage is obviated.

SUMMARY OF THE INVENTION

The objects of the invention are accomplished by the provision of a valve in which at least one flexible tube is opened and closed through the medium of a bead which bears against the surface of a rotatable plug, the plug holding the bead in such a position that the tube is pinched closed except when the plug is turned to a position where a plug portion of varying diameter effects movement of the bead.

BRIEF DESCRIPTION OF THE DRAWING

FIG. 1 is a side plan view of a valve according to the invention.
FIG. 2 is a sectional view taken on line 2—2 of FIG. 1.
FIG. 3 is a sectional view taken on line 3—3 of FIG. 2.
FIG. 4 is a sectional view taken on line 4—4 of FIG. 2.
FIG. 5 is a sectional view taken on line 5—5 of FIG. 3.
FIG. 6 is a plan view of an alternative form of plug.
FIG. 7 is a sectional view taken on line 7—7 of FIG. 6.
FIG. 8 is a sectional view taken on line 8—8 of FIG. 6.

DESCRIPTION OF THE PREFERRED EMBODIMENTS

A valve according to the invention includes a housing 10 having therein a cylindrical bore 12. A cylindrical plug 14 is rotatable in bore 12 by means of control knob 16. Two flexible inlet tubes 18 and 20 are supported within the housing and communicate with outlet tube 22. Set screws 24 and 26 maintain flat disk-like backing members 28 and 30 adjacent to inlet tubes 18 and 20, respectively. The set screws are adjustable and can be used to compensate for wear in the remaining components of the valve. Second disk-like members 32 and 34 are located between the inlet tubes and spherical beads 36 and 38.

For most positions of rotation of plug 14, the surface of the plug maintains the beads in advanced positions with respect to the inlet tubes, as shown in FIG. 4; however, at one position of rotation, where a bead is allowed to fall partially into one of the indentations 40 or 42 in plug 14, the resilience of the tube associated with the particular bead causes it to open to provide a passage for fluid flow. The beads need not be spherical as long as they have end portions adapted for movement into and out of the respective indentations in response to rotation of the plug. Other movable members may be used.

The illustrated valve is the type usually referred to as a "three-way" valve, i.e., the valve can be used to accept fluid through either inlet tube 18, inlet tube 20 or neither tube. The principle of the invention can be used with other number of tubes, and various plug configurations can be used to permit flow through one or more tubes. Plug indentations of varying depth can be used to regulate rate of flow. For example, circumferential plug grooves having a circumferential depth gradient can be used to permit regulation of the rate of flow through a tube. Plug 44, illustrated in FIG. 6–8, could be substituted for plug 14. Plug 44 has two axially and circumferentially spaced-apart grooves 46 and 48. Each of these grooves varies in depth along the circumference of the plug and, accordingly, can be used to regulate the degree of constriction of tubes 18 and 20, thereby regulating the rate of fluid flow therethrough.

Housing 10 may be formed of any suitable metal, such as aluminum, while plug 14 may be formed of metal or, preferably, nylon. The flexible tubes may be formed of plastic or rubber.

Inasmuch as the foregoing description has been provided solely as that of preferred embodiments of the invention, it is intended that the scope of the invention be limited only by the scope of the appended claims.

I claim:
1. A fluid control valve comprising a housing having a bore therein, a plug rotatable in said bore and having a plurality of indentations spaced about its circumference, a plurality of flexible fluid-impervious tubes, backing means for said tubes, said flexible tubes being positioned between said backing means and said plug, each said indentation of said plug being at an axial location corresponding to the position of one of said tubes with respect to the axis of said plug, means for rotating said plug, a movable spherical bead member between each said tube and said plug having a portion adapted for location at least partly in one of said indentations and adapted to cooperate with said plug to maintain said tube in a closed position except when said plug is oriented such that said movable member falls partly within a plug indentation, and a flat disk-like member between each said bead and its associated tube for assisting the compression of said tubes.

2. A plug according to claim 1 in which said bore and said plug are cylindrical.

3. A fluid control valve comprising a housing having a bore therein, a plug rotatable in said bore and having a plurality of indentations spaced about its circumference, a plurality of flexible fluid-impervious tubes, backing means for said tubes, said flexible tubes being positioned between said backing means and said plug, each said indentation of said plug being at an axial location corresponding to the position of one of said tubes with respect to the axis of said plug, means for rotating said plug, a spherical member between each said tube and said plug having a portion adapted for location at least partly in one of said indentations and adapted to cooperate with said plug to maintain said tube in a closed position except when said plug is oriented such that said movable member falls partly within a plug indentation, a flat disklike member between said bead and its associated tube, and each said indentation extending circumferentially about a portion of said plug and varying in depth along its circumferential extent.

References Cited

UNITED STATES PATENTS

| | | | |
|---|---|---|---|
| 1,427,455 | 8/1922 | Gates | 251—7 XR |
| 2,313,550 | 3/1943 | Huber | 251—7 |
| 2,279,693 | 4/1942 | Martin | 137—636.1 |
| 2,396,544 | 3/1946 | Voyle et al. | 251—7 XR |
| 2,706,994 | 4/1955 | Moore | 137—637 XR |
| 3,354,731 | 11/1967 | Kussmaul | 74—55 |
| 3,411,540 | 11/1968 | Ianelli | 251—7 XR |

ROBERT G. NILSON, Primary Examiner

U.S. Cl. X.R.

137—607; 251—7